United States Patent [19]

Shibahata

[11] Patent Number: 5,005,856
[45] Date of Patent: Apr. 9, 1991

[54] REAR SUSPENSION SYSTEM OF AUTOMOBILE

[75] Inventor: Yasuji Shibahata, Saitama, Japan

[73] Assignee: Honda Giken Kogyo Kabushiki Kaisha, Waka, Japan

[21] Appl. No.: 377,975

[22] Filed: Jul. 11, 1989

[30] Foreign Application Priority Data

Jul. 14, 1988 [JP] Japan .................. 63-175348

[51] Int. Cl.$^5$ .............................................. B60G 3/18
[52] U.S. Cl. ............................ 280/688; 280/661; 280/690
[58] Field of Search ............ 280/725, 701, 688, 141.2, 280/690, 661, 141

[56] References Cited

U.S. PATENT DOCUMENTS

| | | | |
|---|---|---|---|
| 3,327,803 | 6/1967 | Cote et al. | 180/73 |
| 4,410,201 | 10/1983 | Iijima et al. | 280/688 |
| 4,717,171 | 1/1988 | Kami et al. | 280/688 |
| 4,834,416 | 5/1989 | Shimoe et al. | 280/688 |

FOREIGN PATENT DOCUMENTS 3341096 5/1985 Fed. Rep. of Germany .
2087322 5/1982 United Kingdom .

Primary Examiner—Richard A. Bertsch
Attorney, Agent, or Firm—Armstrong, Nikaido, Marmelstein, Kubovcik & Murray

[57] ABSTRACT

In a rear suspension system of an automobile, a pair of left and right trailing arms for rear wheels have forward extension arms which extend forwardly past the pivot portions of the trailing arms to the automobile body and the front ends of the extension arms are relatively swingably connected to ends of a relay rod which is resiliently displaceable in the lateral direction of the body through compensator arms inclined inwardly at their front ends. This permits a "toe-in" to be given to each rear wheel when the automobile turns with brake being effected, whereas when the wheels are running on road surfaces of largely different coefficients of friction during braking, a "toe-out" is given to one rear wheel associated with the road surface of higher coefficient of friction.

4 Claims, 4 Drawing Sheets

REAR SUSPENSION SYSTEM OF AUTOMOBILE

BACKGROUND OF THE INVENTION

1. Field of the Invention

The field of the invention is a rear suspension system of an automobile and more particularly is an improved rear suspension system of the type having a pair of left and right trailing arms pivoted vertically swingably to the body of an automobile for carrying left and right rear wheels thereon.

2. Description of the Prior Art

Rear suspension systems of the mentioned type are known, for example, from Japanese patent publication laid-open No. 53408/85.

In this type of rear suspension system, it is desirable, in order to improve the stability of the automobile body during braking operation, to give a "toe-in" to rear wheels when such brake is effected during turning of the vehicle and also to give a "toe-out" to that one of the rear wheels in a braking operation which is travelling on a road surface having a coefficient of friction quite higher than that of the road surface on which the other rear wheel is then travelling.

SUMMARY OF THE INVENTION

The present invention has as its object the provision of a rear suspension system of the afore-mentioned type which has a simple structure and is effective to satisfy the above requirements.

In order to achieve the object, the present invention may provide a system wherein forward extension arms are provided to extend forwardly from the portions of the trailing arms pivoted to the automobile body for permitting resilient longitudinal displacements as well as lateral swinging motions of the trailing arms, and compensator arms are relatively swingably connected at their rear ends to the respective forward extension arms and are inclined so as to have their front ends directed inwardly of the body, the front ends of the compensator arms being connected together for swinging motions relative to each other via a relay rod which is carried on the body laterally displaceably.

Owing to the above arrangement, if braking is effected when an automobile is turning, left and right trailing arms are pulled rearwardly by frictional braking forces which rear wheels receive from the road surfaces. Then, the trailing arms are displaced rearwardly to cause the associated compensator arms to swing in the rear and inward directions of the automobile body. As a result, the compensator arms act on the trailing arms to swing the front ends of the trailing arms inwardly of the automobile body, thus giving a "toe-in" to each rear wheel.

On the other hand, if braking operation is carried out with the left and right rear wheels running on road surfaces having largely different coefficients of friction, it results in that one rear wheel receives a larger frictional braking force from the associated road surface and the other rear wheel receives a smaller braking force from its associated road surface. Thereby, one trailing arm associated with the one rear wheel is pulled strongly towards rear by the larger frictional braking force whereas the other trailing arm associated with the other rear wheel is pulled weakly in the rearward direction by the smaller frictional braking force. The difference between the traction forces acting in the rear direction cause the relay rod to be displaced toward one lateral side on which the larger rearward traction force is acting. With this displacement of the relay rod, the one trailing arm is inclined through the action of one compensator arm so as to direct the associated forward extension arm outwardly of the automobile body. Consequently, the one rear wheel which is in contact with the road surface of larger coefficient of friction is given a "toe-out". Thus the stability of the automobile body is improved.

The above and other objects, features and advantages of the invention will be apparent from reading of the following description of one preferred embodiment in conjunction with the accompanying drawings.

BRIEF DESCRIPTION OF THE DRAWINGS

The accompanying drawings show one embodiment according to the invention, wherein.

DETAILED DESCRIPTION OF PREFERRED EMBODIMENT

One embodiment according to the invention will be described hereinafter with reference to the accompanying drawings. Throughout the description, the terms "front", "rear", "left" and "right" will be used with respect to the body of an automobile.

Figure 1:
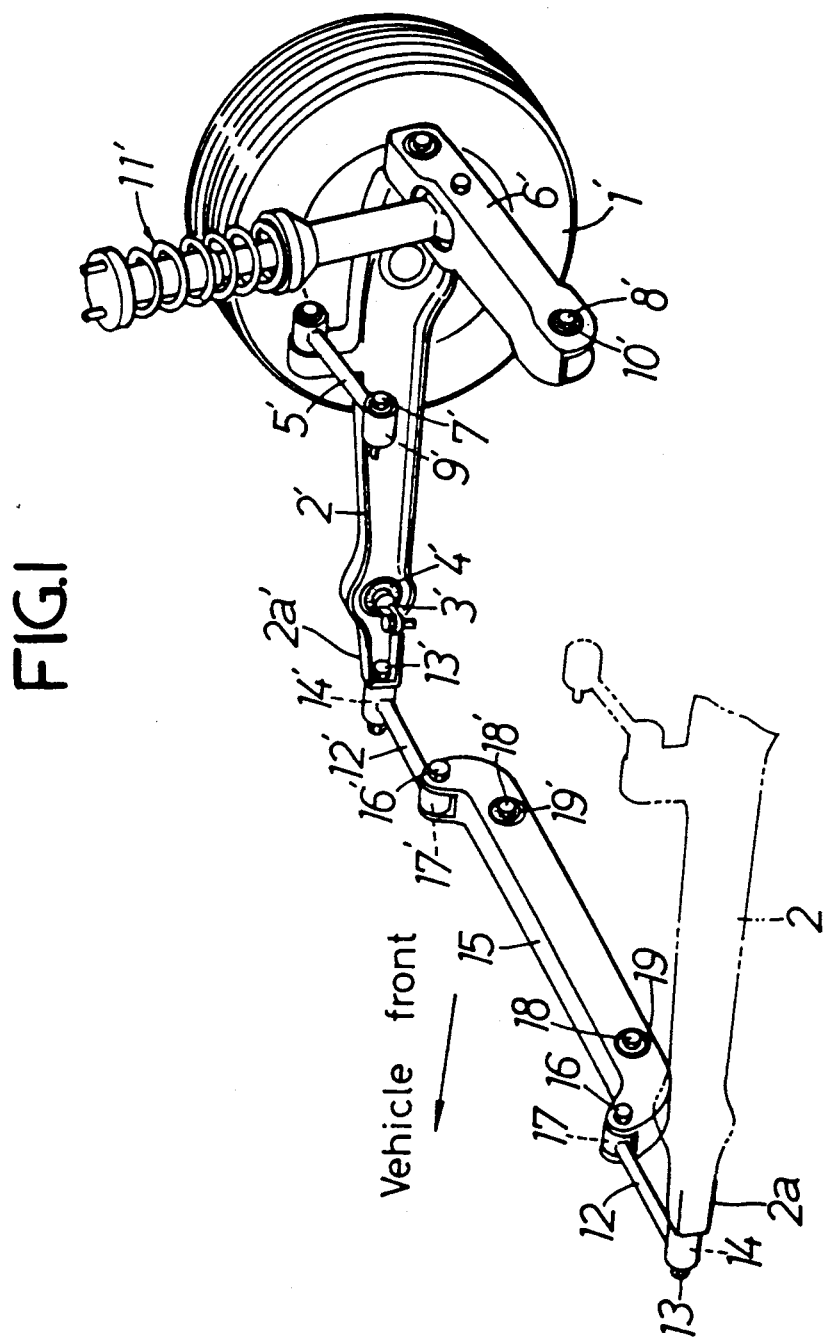
FIG. 1 is a perspective view of the embodiment.
Figure 2:
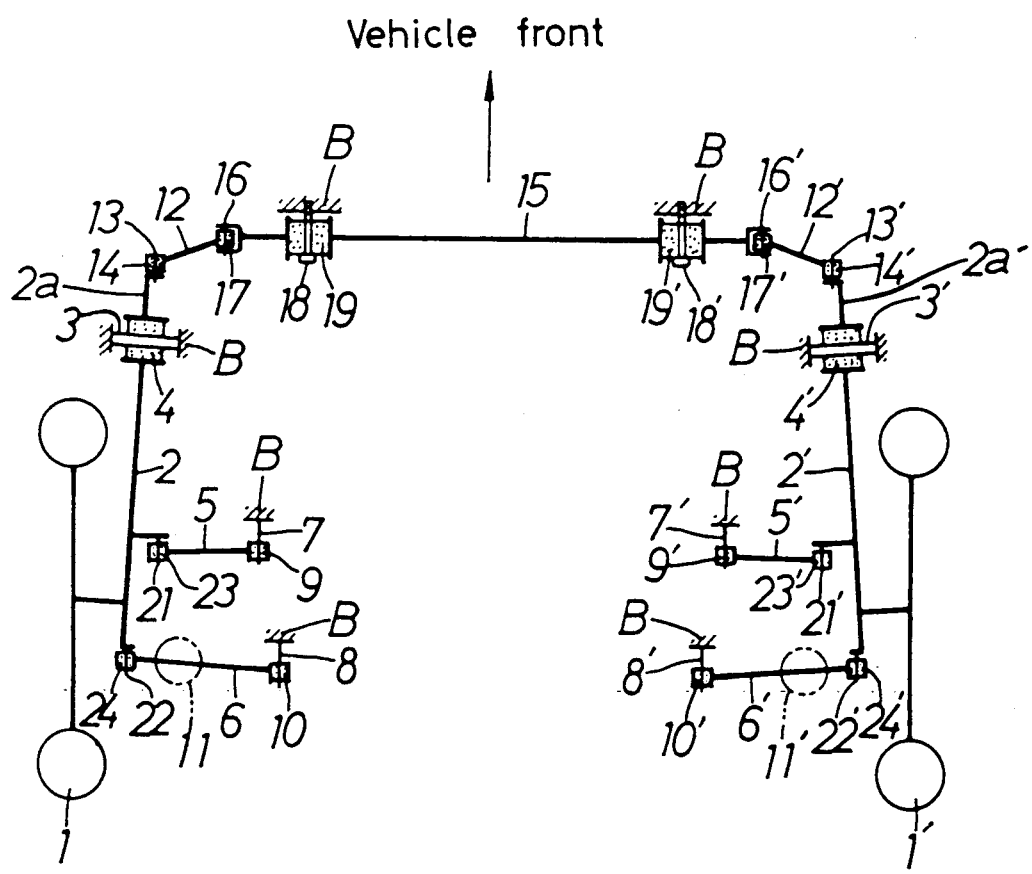
FIG. 2 is a plan view.

FIG. 1 shows a perspective view of a rear suspension system of an automobile and FIG. 2 is a plan view of the system. As shown in these figures, left and right rear wheels 1 and 1' are carried rotatably around respective axes by a pair of left and right trailing arms 2 and 2' which extend forwardly and are pivoted at front end portions thereof to an automobile body B via pivot shafts 3, 3' and resilient bushings 4, 4' surrounding the shafts for vertical swinging movements therearound. Accordingly, the trailing arms 2 and 2' can displace in the longitudinal or travelling direction of the automobile body B and can swing leftwards and rightwards by resilient deformation of the bushings 4 and 4', respectively.

On left and right sides of the body B respective pairs of upper arms 5, 5' and lower arms 6, 6' are pivoted to the body B through pivot shafts 7, 8; 7', 8' and resilient bushings 9, 10; 9', 10' surrounding the shafts for vertical swing motion, so as to extend in the lateral direction or in left and right directions. Therefore, the upper arms 5, 5' and lower arms 6, 6' can swing in the longitudinal direction of the body B through deformation of the resilient bushings 9, 10; 9', 10'. Outer ends of the respective upper and lower arms 5, 5' and 6, 6' are connected to rear portions of the trailing arms 2 and 2' through joint shafts 21, 21' and 22, 22' as well as resilient bushings 23, 23' and 24, 24'.

The lower arms 6, 6' are formed longer than the upper arms 5, 5' and shock absorbers 11, 11' equipped with suspension springs are interposed between the lower arms 6, 6' and the body B, respectively. The upper arms 5, 5' and the lower arms 6, 6' thus cooperate with each other to regulate the camber of the rear wheels 1, 1' at the time of vertical swing motion of the rear wheels 1, 1'.

The trailing arms 2, 2' are integrally provided with forward extension arms 2a, 2a' which extend further forwardly of the pivot shafts 3, 3' and the forward extension arms 2a, 2a' are connected at front tip ends thereof to the rear ends of compensator arms 12, 12', respectively, through joint shafts 13, 13' and resilient bushings 14, 14' which surround the respective shafts 13, 13'. Accordingly, the forward extension arms 2a, 2a' and the compensator arms 12, 12' can perform swing movements relative to each other around their mutual connections due to deformation of the resilient bushings 14, 14'. The compensator arms 12, 12' are inclined so as to be directed inwardly of the body B at their front ends and opposite ends of a single relay rod 15 are connected to the front ends of the compensator arms 12, 12' through joint shafts 16, 16' and surrounding resilient bushings 17, 17', respectively. Consequently, the compensator arms 12, 12' can swing relative to the relay rod 15 around their connections through deformation of the resilient bushings 17, 17'.

The relay rod 15 is mounted onto the body B via a pair of left and right mounting shafts 18, 18' and surrounding resilient bushings 19, 19' so that the relay rod 15 can move or displace to the left and right while deforming the resilient bushings 19, 19'.

The operation of this embodiment will next be described.

Figure 3:
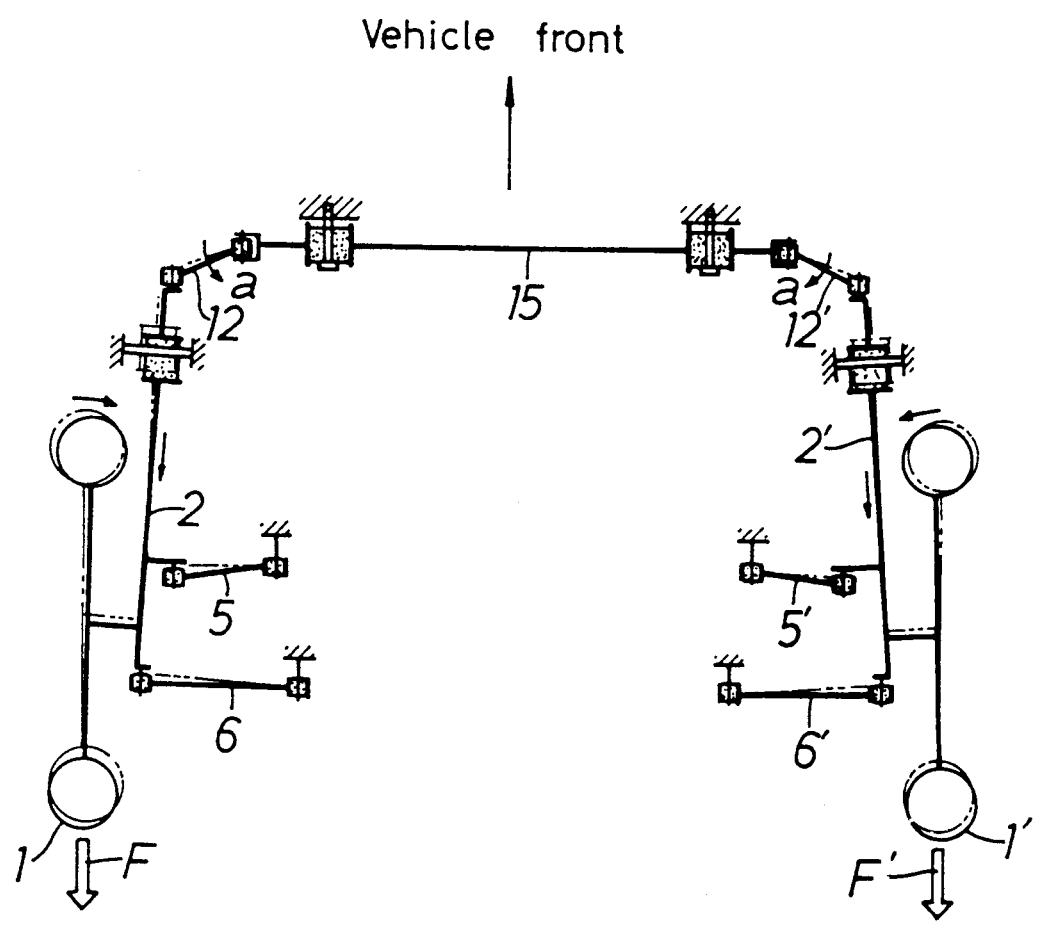
FIG. 3 is a view explaining the operation where brake is effected during turning.

Referring first to FIG. 3, it is assumed that the automobile is turning and a braking operation is carried out. If, in this case, the frictional braking forces F, F' which the left and right rear wheels 1, 1' receive from the respectively associated road surfaces are substantially equal to each other, then the left and right upper and lower arms 5, 6; 5', 6' are caused, with the mentioned frictional braking forces F, F', to swing rearwardly around the respective pivot shafts 7, 7'; 8, 8' while deforming the resilient bushings 9, 9'; 10, 10', thereby pulling the associated trailing arms 2, 2', in the rearward direction and displacing them slightly rearwardly by deformation of the resilient bushings 4, 4'.

Since the rearward traction forces thus acting on both the trailing arms 2, 2' are almost equal to each other, there is no lateral displacement occurring in the relay rod 15 even if such traction forces are transmitted to the compensator arms 12, 12'.

The compensator arms 12, 12' are, however, arranged such that their front ends are inclined inwardly of the body B toward each other as mentioned above, as a result of which any rearward traction forces transmitted from the trailing arms 2, 2' act on the compensator arms 12, 12' to cause the latters to swing inwardly of the body B in the directions a, respectively, around their connections to the relay rod 15, that is, around the joint shafts 16, 16' which each serve as a fulcrum. This results in swinging motion of the trailing arms 2, 2' thereby to equally give a "toe-in" to both the rear wheels 1, 1'. Thus, the body is assured its stability at the time of braking operation during turn.

Figure 4:
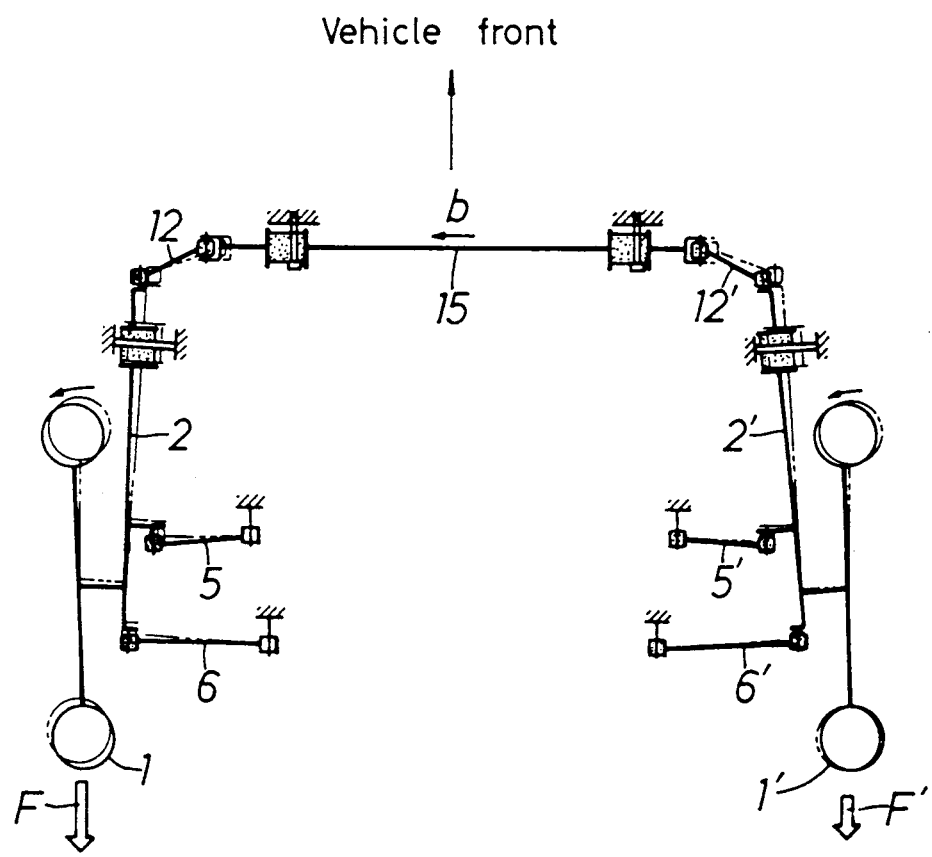
FIG. 4 is a view explaining the operation where brake is effected with left and right rear wheels running on road surfaces of different coefficients of friction.

Referring next to FIG. 4, it is assumed that the brake is effected when the automobile is travelling straightforwardly. If the coefficients of friction of the road surfaces with the left and right rear wheels 1, 1' are placed in contact differ largely from each other, and if the frictional braking force F which the left rear wheel 1 receives from its contacting road surface is quite larger than the frictional braking force F' the right rear wheel 1' receives from the road surface, for example, the difference between the frictional braking forces F and F' causes a displacement of the relay rod 15 in the leftward direction as shown by an arrow b while deforming the resilient bushings 19, 19' whereby the front end of one extension arm 2a is displaced outwardly of the body B through the action of the left-hand compensator arm 12 and this is accompanied by a swing motion of the left-hand trailing arm 2. In consequence, a "toe-out" is given to the left rear wheel 1, that is, to one rear wheel 1 which is in contact with the road surface having a higher coefficient of friction. By one rear wheel 1 assuming a "toe-out" position, the spinning tendency of the automobile body is suppressed to assure the stability thereof.

What is claimed is:

1. A rear suspension system of an automobile, comprising:
    a pair of left and right trailing arms pivoted vertically swingably to a body of the automobile for carrying thereon left and right rear wheels, respectively;
    forward extension arms extending forwardly from portions of the respective trailing arms pivoted to said automobile body for permitting longitudinal displacements as well as lateral swinging motions of the trailing arms in a resilient fashion;
    left and right compensator arms inclined so as to have front ends thereof directed inwardly of the automobile body and rear ends thereof connected to said forward extension arms for swinging motions relative to each other; and
    a relay rod carried on the automobile body in a manner displaceable in a lateral direction with respect to the body, said relay rod providing a connection between the front ends of the compensator arms such that the front ends of the compensator arms are swingable relative to each other via the relay rod.

2. The system of claim 1, wherein said trailing arms are carried on the automobile body via shaft means directed substantially in the lateral direction of the body as well as resilient bushings surrounding the shaft means and wherein said relay rod is carried on the body via further shaft means directed substantially longitudinally of the body with resilient bushings surrounding said further shaft means.

3. The system of claim 1, wherein said relay rod is positioned laterally centrally of the automobile body and is connected at lateral opposite ends thereof to said left and right compensator arms, respectively.

4. The system of claim 1, further comprising left and right arm members each of which extends laterally of the automobile body to be coupled at one of opposite ends thereof to a rear portion of the associated trailing arm and at the other end to the automobile body.

* * * * *